US009743123B2

(12) United States Patent
Feldman et al.

(10) Patent No.: US 9,743,123 B2
(45) Date of Patent: Aug. 22, 2017

(54) MULTI-CHANNEL VIDEO PLAYBACK SYSTEM WITH VARIABLE TIME DELAY

(71) Applicant: Disney Enterprises, Inc., Burbank, CA (US)

(72) Inventors: Vladislav Feldman, Manhasset Hills, NY (US); Efthimis Stefanidis, Douglaston, NY (US); Joseph P. Kenny, Floral Park, NY (US)

(73) Assignee: Disney Enterprise, Inc., Burbank, CA (US)

( * ) Notice: Subject to any disclaimer, the term of this patent is extended or adjusted under 35 U.S.C. 154(b) by 0 days.

(21) Appl. No.: 14/720,471

(22) Filed: May 22, 2015

(65) Prior Publication Data

US 2016/0345043 A1 Nov. 24, 2016

(51) Int. Cl.
*H04N 7/173* (2011.01)
*H04N 21/262* (2011.01)
*H04N 21/2385* (2011.01)
*H04N 21/234* (2011.01)
*H04N 21/258* (2011.01)
*H04N 21/845* (2011.01)

(52) U.S. Cl.
CPC ... *H04N 21/26241* (2013.01); *H04N 21/2385* (2013.01); *H04N 21/23424* (2013.01); *H04N 21/25841* (2013.01); *H04N 21/26275* (2013.01); *H04N 21/8456* (2013.01)

(58) Field of Classification Search
CPC ......... H04N 21/26241; H04N 21/2385; H04N 21/8456; H04N 21/26275; H04N 21/25841; H04N 21/23424

USPC ................. 725/27, 35, 54, 95, 115
See application file for complete search history.

(56) References Cited

U.S. PATENT DOCUMENTS

| 5,751,883 | A | * | 5/1998 | Ottesen | G11B 20/1217 348/E5.008 |
|---|---|---|---|---|---|
| 6,698,020 | B1 | * | 2/2004 | Zigmond | H04N 5/44513 348/E5.102 |
| 7,694,318 | B2 | * | 4/2010 | Konig | G06F 17/30802 725/32 |
| 2006/0143669 | A1 | * | 6/2006 | Cohen | H04N 7/173 725/90 |
| 2008/0310445 | A1 | * | 12/2008 | Bellwood | H04N 21/238 370/468 |

(Continued)

*Primary Examiner* — Nnenna Ekpo
(74) *Attorney, Agent, or Firm* — Farjami & Farjami LLP

(57) ABSTRACT

There is provided a video playback system comprising a plurality of video playback channels, a memory, and a processor configured to transmit a first video content over a first playback channel, store a first video transmission being transmitted over the first video playback channel in the memory, start transmitting, at a second time, the first video transmission from the memory over a second playback channel, receive an update segment for replacing a first segment of the first video transmission and a location of the first segment in the first video transmission, detect the location of the first segment in the first video transmission, transmit the update segment in place of the first segment over the second video playback channel, revert to transmitting the first video transmission over the second video playback channel, and store a second video transmission being transmitted over the second video playback channel in the memory.

20 Claims, 3 Drawing Sheets

(56) References Cited

U.S. PATENT DOCUMENTS

| | | | |
|---|---|---|---|
| 2009/0106792 A1* | 4/2009 | Kan | H04N 7/17318 |
| | | | 725/34 |
| 2012/0023522 A1* | 1/2012 | Anderson | G06Q 30/02 |
| | | | 725/35 |
| 2012/0047542 A1* | 2/2012 | Lewis | H04N 21/44016 |
| | | | 725/97 |
| 2014/0325550 A1* | 10/2014 | Winograd | H04N 21/44236 |
| | | | 725/19 |
| 2015/0006752 A1* | 1/2015 | O'Hare | H04L 65/4069 |
| | | | 709/231 |
| 2015/0012943 A1* | 1/2015 | Mampaey | H04H 20/106 |
| | | | 725/39 |

* cited by examiner

US 9,743,123 B2

MULTI-CHANNEL VIDEO PLAYBACK SYSTEM WITH VARIABLE TIME DELAY

BACKGROUND

National broadcasting companies frequently broadcast the same show in multiple time zones, which requires multiple video time zone feeds. For example, a show may air live in New York at 7:00 am, and then be replayed an hour later, two hours later or three hours later in different time zones across the country. Correction of errors made during production of the live broadcast, and editorial updates, such as news updates, need to be included in the delayed broadcasts. Conventional approaches involve high labor costs, high hardware costs, high power and cooling costs, as well as high costs of maintenance.

SUMMARY

The present disclosure is directed to systems and methods for a video playback system having multiple playback channels with variable time delay, substantially as shown in and/or described in connection with at least one of the figures, as set forth more completely in the claims.

DETAILED DESCRIPTION

Figure 1:
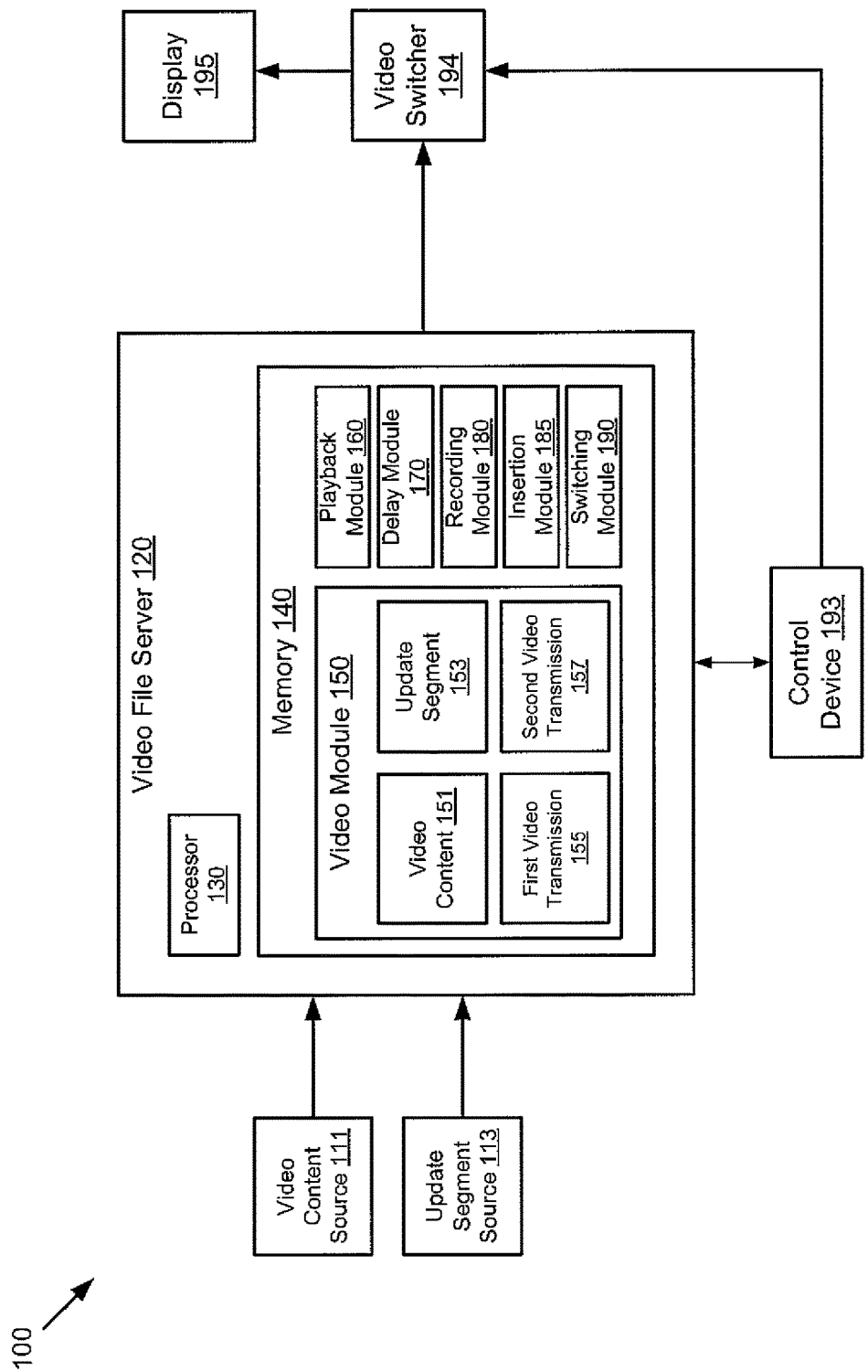
FIG. 1 shows a diagram of an exemplary multi-channel video playback system with variable delay, according to one implementation of the present disclosure.

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1 shows a diagram of an exemplary multi-channel video playback system with variable delay, according to one implementation of the present disclosure. As shown in FIG. 1, multi-channel video playback system 100 includes video content source 111, update segment source 113, video file server 120, including processor 130 and memory 140. Video playback system 100 may also include control device 193, video switcher 194 and display 195. Although, for the sake of brevity, the exemplary implementations below refer to video, one of ordinary skill in the art should appreciate that the exemplary implementations may also use audio/video or audio only.

Video content source 111 may include a video camera capturing a live event, a video transmission of a previously recorded video content, a video content received from a computer network, a video content received from the Internet, or any other source providing a video content. Video content source 111 may be a provider of video content, such as a national broadcast network, a regional affiliate, a local affiliate, a regional content provider, a local content provider, or any other source of video content. In some implementations, video content may be obtained from more than one source. For example, various sources may provide various video contents, such as morning news program content from a live broadcast, an advertising content from a national network and an advertising content from a local affiliate.

Update segment source 113 may be a video source that provides a supplemental video content. In some implementations, update segment source 113 may provide video content to update or replace a segment of video content previously received from video content source 111. Update segment source 113 may include a national broadcast company, a regional broadcast affiliate, a local affiliate, a regional content provider, a local content provider, or any other suitable provider of content that may be used to update video content.

Video file server 120 includes processor 130 and memory 140. As shown in FIG. 1, memory 140 includes video module 150, playback module 160, delay module 170, recording module 180, insertion module 185, and switching module 190. Processor 130 may access memory 140 to store audio/video content or to execute commands, processes, or programs stored in memory 140. Processor 130 may correspond may be a microprocessor or any hardware processing device. Memory 140 is a non-transitory hardware storage device capable of storing media content, commands, processes, and programs for execution by processor 130.

Video file server 120 may include a plurality of video playback channels. In some implementations, each playback channel may include a corresponding delay, and each corresponding delay may be configurable. In some implementations, each of the plurality of video playback channels has a corresponding one of a plurality of video record channels, and each of the plurality of video record channels may be configured to record the transmission of the corresponding video playback channel in a record loop having a set duration, such as a thirty minute loop, a one hour loop, a two hour loop, a six hour loop, a twelve hour loop, or a loop having a duration of any combination of the enumerated times up to about twenty-four hours. In some implementations, video playback system 100 may perpetually record each video playback channel in a loop that overwrites itself after the set duration.

Video module 150, as shown in FIG. 1, includes video content 151, update segment 153, first video transmission 155, and second video transmission 157. Video module 150 may store content received from video content source 111 or update segment source 113, such as video content 151 and update segment 153. Video module 150 may store recorded video content such as first video transmission 155 and second video transmission 157.

In some implementations, video content 151 may include a live television broadcast, such as a news program or a morning news show, a recorded television program, a movie, or any other video content that may be suitable for broadcasting to viewers. In some implementations, video content received from video content source 111 may include markers, tags, or a detectable type of indicator to indicate the location of a segment of video content 151, such as a segment including news content. In some implementations, the location of a segment of video content 151 may be a frame accurate location. Video content 151 may be intended for broadcasting live in a first time zone, such as the Eastern Time zone, and broadcasting on a delay in one or more other time zones, such as the Central Time zone, the Mountain Time zone, and the Pacific Time zone.

When a broadcasting company broadcasts a morning news program as a live show to viewers in the Eastern Time zone, the broadcast may involve one or more news segments that include news events that are current at the time of the live broadcast. Such current news events, and information related to them, may change between the live broadcast and subsequent delayed broadcasts. For example, during an earlier broadcast in the Eastern Time zone, a car chase may be broadcast and recorded for broadcast in the Central Time zone. However, the car chase may come to an end by the time the Central Time zone broadcast is to be made.

To maintain the integrity of the morning news program, the broadcast company may desire to replace an earlier news segment with an updated news segment, including any updates or changes. The broadcasting company may create an updated news segment to be included in a delayed broadcast, and that updated segment may be stored as update segment 153. In some implementations, update segment 153 may have a duration matching the duration of the segment update segment 153. By matching the duration of the included news segment, the broadcast company may transmit a seamless video stream by executing a frame accurate switch to update segment 153 at the beginning of the segment to be replaced, and executing a frame accurate switch reverting to video content 151 at the end of update segment 153.

Video module 150 may also include first video transmission 155 and second video transmission 157. In some implementations, first video transmission 155 may include a recording of a live broadcast of video content 151. Second video transmission 157 may include a recording of a delayed broadcast of video content 151. The delayed broadcast of video content 151 may include a broadcast of first video transmission 155. In some implementations, second video transmission 157 may include video content 151 and may include update segment 153.

Memory 140 may additionally include programs, commands, and scripts to run, such as playback module 160, delay module 170, recording module 180, insertion module 185, and switching module 190. Playback module 160 may be used to playback video content on a playback channel of video file server 120, such as video content 151, update segment 153, first video transmission 155, or second video transmission 157. Video playback system 100 may use delay module 170 to delay broadcasts. In some implementations, delay module 170 may control the delay corresponding to each video playback channel of video file server 120. For example, video playback system 100 may transmit a morning news program as a live broadcast on a first video playback channel, and may record the live broadcast as first video transmission 155. Using delay module 170, video playback system 100 may configure a second playback channel of video file server 140 to playback the recorded content on a thirty-minute delay, a sixty-minute delay, or any other suitable delay.

Recording module 180 may create recordings of video content including recordings of transmitted video content. In some implementations, video playback system 100 may use recording module 180 to store a video transmission transmitted over a video playback channel of video file server 120. In some implementations, recording module 180 may store a transmission as first video transmission 155 or second video transmission 157. Video playback system 100 may access stored recordings and, transmit a stored content as a delayed broadcast using playback module 160 and delay module 170.

Insertion module 185 may replace a segment of video content 151 with update segment 153. In order to make a frame accurate switch from video content 151 to update segment 153, insertion module 185 may detect a location of the segment to be replaced. In some implementations, video content 151 may include a first segment containing media content that may be updated for subsequent broadcasts of video content 151. Insertion module 185 may detect the location of the first segment in video content 151 while video playback system 100 is broadcasting the subsequent broadcast of video content 151. In some implementations, insertion module 185 may instruct video switcher 194 to execute a frame accurate switch between input channels to replace a first segment of video content 151 with update segment 153 in a broadcast transmission. Insertion module may revert to video content 151 at the end of update segment 153. Video playback system 100 may use insertion module 185 to make frame accurate switches at the beginning and end of a replacement segment in video content 151.

Switching module 190 may switch between playback channels of video file server 120. In some implementations, switching module 190 may execute frame accurate switches between playback channels of video file server 120 to create seamless video transmissions including video content 151 and update segment 153.

Control device 193 may communicatively connect to video file server 120. In some implementations, video playback system 100 may be configured to receive instructions from a user via control device 193. In some implementations, control device 193 may control the plurality of playback channels and each of the corresponding configurable delays. Control device 193 may instruct video file server 120 regarding the plurality of video playback channels, configurable delay settings, playback module 160 settings, delay module 170 settings, recording module 180 settings, insertion module 185 settings, and switching module 190 settings. In some implementations, a user may provide the location of the first segment in the first video transmission using control device 193.

Video switcher 194 includes one or more video inputs and one or more video outputs. As shown in FIG. 1, the one or more video inputs of video switcher 194 may be connected to video file server 120. In some implementations, video switcher 194 may receive a video input signal and/or a control signal from control device 193. Video switcher 194 may also receive a video input signal from video file server 120 or other video components, such as a video tape player. Video switcher 194 is configured to switch between its video inputs to create a seamless video output on one or more of its video outputs by performing frame accurate switches between a first video input and a second video input and providing same on one of its video outputs.

Display 195 may be a display of a user device such as a television display, a computer display, a tablet computer display, a display of a smart phone, or any other display suitable for displaying video content.

Figure 2:
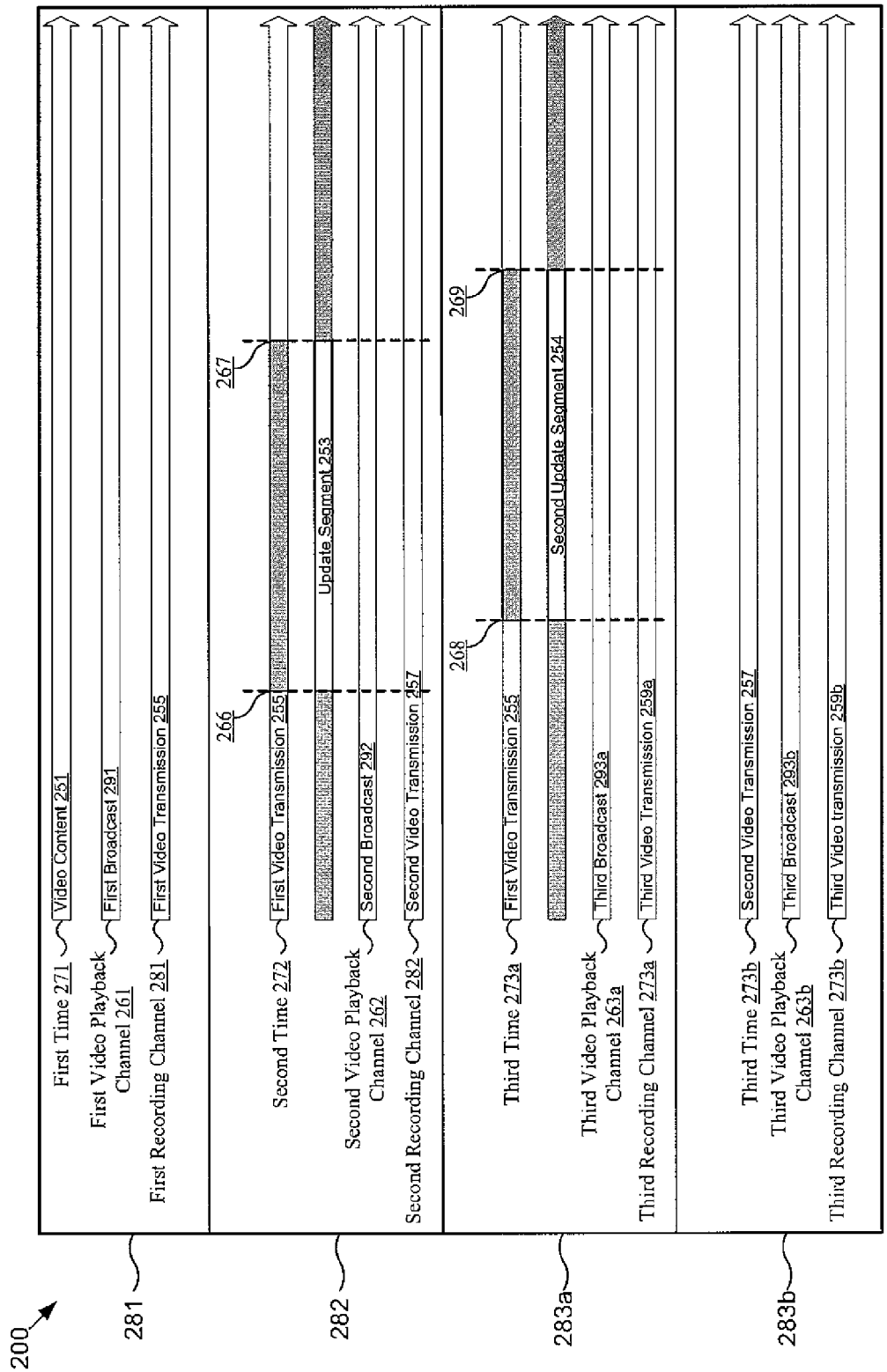
FIG. 2 shows a flow diagram of creating delayed broadcasts including updated segments, according to one implementation of the present disclosure.

FIG. 2 shows a flow diagram of creating delayed broadcasts including updated segments, according to one implementation of the present disclosure.

At 281, video playback system 100 transmits video content 251 over first video playback channel 261, as first broadcast 291 at first time 271. While video playback system 100 transmits video content 251, recording module 180 stores first broadcast 291 as first video transmission 255.

At 282, video playback system 100 transmits the first video transmission at second time 272 after first time 271. While playback module 160 is playing first video transmission 255, insertion module 185 detects a first segment to be replaced in first video transmission 255 at location 266 and sends a command to switching module 190. Switching module 190, in response to the command, switches from first video transmission 255 to update segment 253 at location 266. At location 267, insertion module 185 detects the end of update segment 253 and sends a command to switching module 190 to revert to first video transmission 255. Video playback system 100 transmits the seamless video on second video playback channel 262 and recording module 180 stores second broadcast 292 as second video transmission 257.

At 283*a*, video playback system 100 starts to transmit the first video transmission at third time 273*a* after second time 272, on third video playback channel 263*a*. While transmitting first video transmission 255 over third video playback channel 263*a*, video playback system 100 receives second update segment 254 for a second segment of the first video transmission, and a location of the second segment in the first video transmission. While playback module 160 is playing first video transmission 255, insertion module 185 detects a location of the second segment to be replaced in first video transmission 255 at location 268 and sends a command to switching module 190. Switching module 190, in response to the command, switches from first video transmission 255 to second update segment 254 at location 266. At location 269, insertion module 185 detects the end of second update segment 254 and sends a command to switching module 190 to revert to first video transmission 255. Video playback system 100 transmits the seamless video on third video playback channel 263*a* and recording module 180 stores third broadcast 293*a* as third video transmission 259*a*.

At 283*b*, video playback system 100, at third time 273*b* after second time 272, transmits second video transmission 257 as third broadcast 293*b* on third video playback channel 263*b*. Third broadcast 293*b* includes update segment 253 in second video transmission 257. Recording module 180 may store third broadcast 293*b* as third video transmission 259*b*.

Figure 3:
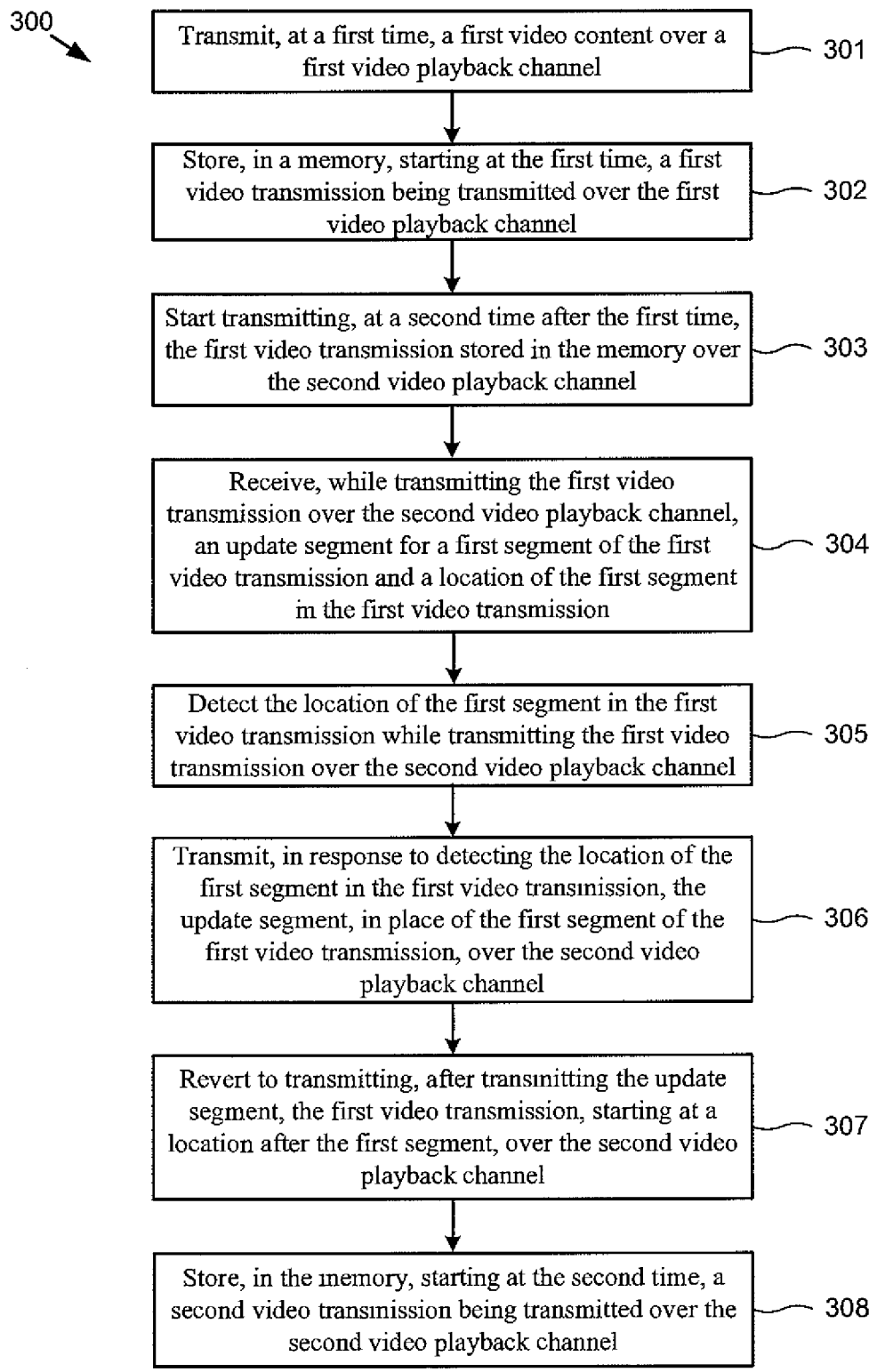
FIG. 3 shows an exemplary flowchart illustrating a method of providing updated segments, according to one implementation of the present disclosure.

FIG. 3 shows an exemplary flowchart illustrating a method of providing updated segments, according to one implementation of the present disclosure.

At 301, video file server 120 transmits, at a first time, a first video content over the first video playback channel. The first video content may include a live video stream for live broadcast. Alternatively, the first video content may include recorded content such as a television program or a movie. In some implementations, the first video content may include a segment, such as a breaking news segment, that includes information that is current at the time of the live broadcast, but may not be current at a later time.

At 302, video file server 120 stores, in the memory, starting at the first time, a first video transmission being transmitted over the first video playback channel. Video playback system 100 may store the first video transmission in video module 150, memory 140, or in another memory accessible for playback of the first video transmission.

At 303, video file server 120 starts transmitting, at a second time after the first time, the first video transmission stored in the memory over the second video playback channel. The second video playback channel may have a corresponding delay, and in some implementations, the delay may be a configurable delay. The delay may be set so that the second time is a set time after the first time and may be useful for a morning news program that broadcasts in different time zones across the country. The delay may be set so that a morning news program that broadcasts live at a first time in the Eastern Time zone is broadcast as recorded content on a one hour delay for the Central Time zone. Appropriate delays may also be set for the recorded content to broadcast at a third time in the Mountain Time zone and at a fourth time in the Pacific Time zone.

At 304, video file server 120 receives, while transmitting the first video transmission over the second video playback channel, an update segment for a first segment of the first video transmission and a location of the first segment in the first video transmission. In some implementations, the first segment may be a portion of the first video transmission that contains information that is current at the time the first video transmission is broadcast, but is not current at the second time. The location of the first segment in the first video transmission may be a time relative to an internal clock of video playback system 100. The location may be a time according to a time code or a frame number of the first video transmission. The update video segment may have a duration. In some implementations, the update video segment has a duration that matches the duration of the first segment. The update video segment may include information regarding an event in the first segment, but having updated information that is current at the time the update video segment is created. In some implementations, the update video segment may include information that is not related to any information in the first segment.

At 305, video file server 120 detects the location of the first segment in the first video transmission while transmitting the first video transmission over the second video playback channel. In some implementations, insertion module 185 may detect a tag or a marker in first video transmission 155 that indicates the location of the beginning of the first segment. After detecting the location of the first segment, insertion module 185 may send a command to switching module 190. Detecting the location of the first segment may include a frame accurate location of the first segment in the first video transmission.

At 306, video file server 120 transmits, in response to detecting the location of the first segment in the first video transmission, the update segment, in place of the first segment of the first video transmission, over the second video playback channel. In some implementations, video playback system 100 may switch from transmission of the stored first transmission to transmission of the update video segment by switching playback channels of video file server 120. In some implementations, video playback system may include control device 193 connected to video file server 120 and a video switcher 194. Control device 193 may be used as a user control to instruct video file server 120 to send first video transmission 155 and update video segment to the video switcher 194, and instruct the video switcher 194 when to switch input channels to execute a frame accurate switch and transmit a seamless video content including update segment 153.

At 307, video file server 120 reverts to transmitting, after transmitting the update segment, the first video transmission, starting at a location after the first segment, over the second video playback channel. Reverting to transmitting the first video transmission over the second video playback channel may include executing a frame accurate switch from update segment 153 to first video transmission 155 at the end of update segment 153.

At 308, video file server 120 stores, in the memory, starting at the second time, a second video transmission being transmitted over the second video playback channel, including update segment 153 replacing the first segment.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A video file server for use in a video playback system, the video file server comprising:
   a plurality of video playback channels including a first video playback channel and a second video playback channel;
   a memory; and
   a processor configured to:
      transmit, at a first time, a first video content over the first video playback channel;
      store, in the memory, starting at the first time, a first video transmission being transmitted over the first video playback channel;
      start transmitting, at a second time after the first time, the first video transmission stored in the memory over the second video playback channel;
      receive, while transmitting the first video transmission over the second video playback channel, an update segment for a first segment of the first video transmission and a location of the first segment in the first video transmission;
      detect the location of the first segment in the first video transmission while transmitting the first video transmission over the second video playback channel;
      transmit, in response to detecting the location of the first segment in the first video transmission, the update segment, in place of the first segment of the first video transmission, over the second video playback channel;
      revert to transmitting, after transmitting the update segment, the first video transmission, starting at a location after the first segment, over the second video playback channel; and
      store, in the memory, starting at the second time, a second video transmission being transmitted over the second video playback channel.

2. The video playback system of claim 1, wherein the processor is further configured to:
   transmit, at a third time after the second time, the second video transmission stored in the memory over a third video playback channel of the plurality of playback channels.

3. The video playback system of claim 1, wherein the processor is further configured to:
   start transmitting, at a third time after the second time, the first video transmission stored in the memory over a third video playback channel of the plurality of playback channels;
   receive, while transmitting the first video transmission over the third video playback channel, a second update segment for a second segment of the first video transmission and a location of the second segment in the first video transmission;
   detect the location of the second segment in the first video transmission while transmitting the first video transmission over the third video playback channel;
   transmit, in response to detecting the location of the first segment in the first video transmission, the second update segment, in place of the second segment of the first video transmission, over the third video playback channel; and
   revert to transmitting, after transmitting the update segment, the first video transmission, starting at a location after the second segment, over the third video playback channel.

4. The video playback system of claim 1, wherein each video playback channel of the plurality of video playback channels includes a corresponding configurable delay for transmitting the first video transmission.

5. The video playback system of claim 4, further comprising a control device for controlling the plurality of playback channels and of the corresponding configurable delay for transmitting the first video transmission.

6. The video playback system of claim 5, wherein the location of the first segment is provided by a user.

7. The video playback system of claim 1, wherein the first video content is a live broadcast.

8. The video playback system of claim 1, wherein each of the plurality of video playback channels has a corresponding one of a plurality of video record channels, and wherein each of the plurality of video record channels is configured to record the transmission of the corresponding video playback channel in a record loop having a duration.

9. The video playback system of claim 1, wherein the location of the first segment is a frame accurate location.

10. The video playback system of claim 1, wherein the first segment has a duration, and the update segment has a duration equal to the duration of the first segment.

11. A method of video playback using a video playback system including a video file server having a plurality of playback channels including a first video playback channel and a second video playback channel, a memory, and a processor, the method comprising:
   transmitting, using the processor, at a first time, a first video content over the first video playback channel;
   storing, in the memory, starting at the first time, a first video transmission being transmitted over the first video playback channel;
   start transmitting, using the processor, at a second time after the first time, the first video transmission stored in the memory over the second video playback channel;
   receiving, using the processor, while transmitting the first video transmission over the second video playback channel, an update segment for a first segment of the first video transmission and a location of the first segment in the first video transmission;
   detecting, using the processor, the location of the first segment while transmitting the first video transmission over the second video playback channel;
   transmitting, using the processor, in response to detecting the location of the first segment in the first video transmission, the update segment, in place of the first segment of the first video transmission, over the second video playback channel;
   reverting, using the processor, to transmitting, after transmitting the update segment in the first video transmission, the first video transmission, starting at a location after the first segment, over the second video playback channel; and storing, in the memory, starting at the second time, a second video transmission being transmitted over the second video playback channel.

12. The method of claim 11, further comprising:
transmitting, using the processor, at a third time after the second time, the second video transmission stored in the memory over a third video playback channel of the plurality of playback channels.

13. The method of claim 11, further comprising:
starting to transmit, using the processor, at a third time after the second time, the first video transmission stored in the memory over a third video playback channel of the plurality of playback channels;

receiving, using the processor, while transmitting the first video transmission over the third video playback channel, a second update segment for a second segment of the first video transmission and a location of the second segment in the first video transmission;

detecting, using the processor, the location of the a second segment in the first video transmission, while transmitting the first video transmission over the third video playback channel;

transmitting, using the processor, in response to detecting the location of the first segment in the first video transmission, the second update segment, in place of the second segment of the first video transmission, over the third video playback channel; and reverting, using the processor, to transmitting, after transmitting the update segment, the first video transmission, starting at a location after the second segment, over the third video playback channel.

14. The method of claim 11, wherein each video playback channel of the plurality of video playback channels includes a corresponding configurable delay for transmitting the first video transmission.

15. The method of claim 14, further comprising:
controlling, using a control device of the video playback system, the plurality of playback channels and plurality of configurable delay for transmitting the first video transmission.

16. The method of claim 15, wherein the location of the first segment is provided by a user.

17. The method of claim 11, wherein the first video content is a live broadcast.

18. The method of claim 11, wherein each of the plurality of video playback channels has a corresponding one of a plurality of video record channels, and wherein each of the plurality of video record channels is configured to record the transmission of the corresponding video playback channel in a record loop having a duration.

19. The method of claim 11, wherein the location of the first segment is a frame accurate location.

20. The method of claim 11, wherein the first segment has a duration, and the update segment has a duration equal to the duration of the first segment.

* * * * *